(No Model.) 2 Sheets—Sheet 1.
F. M. SPARROW.
ELECTRIC VALVE OPERATING DEVICE.
No. 394,220. Patented Dec. 11, 1888.
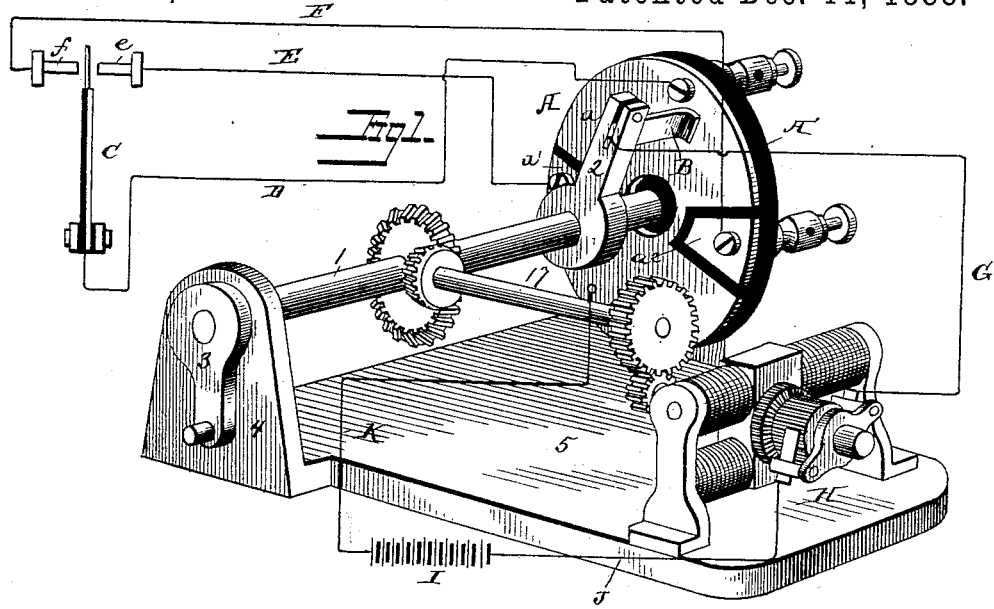
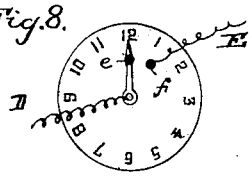
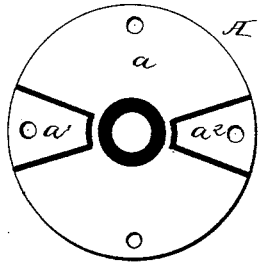
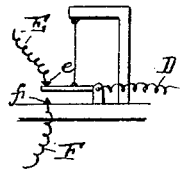
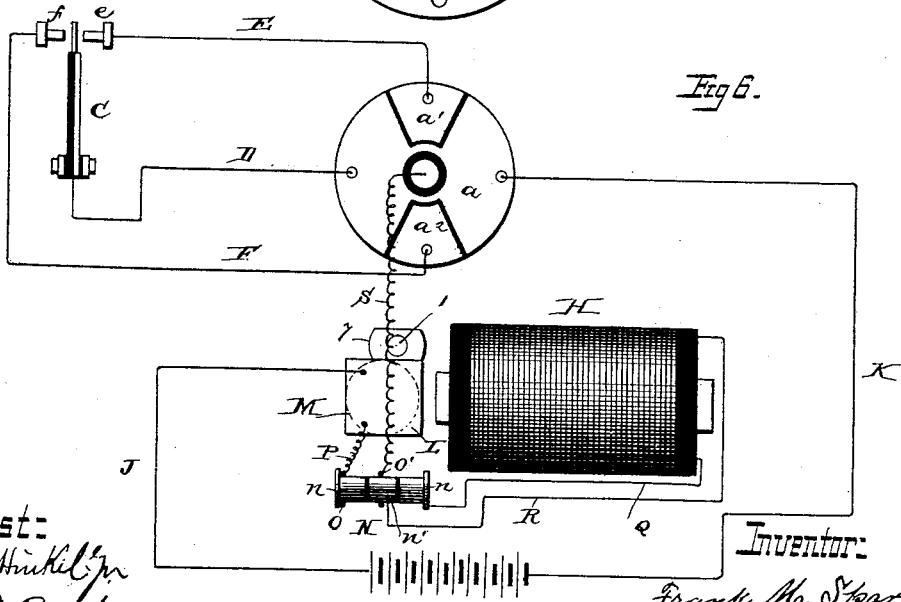
Attest:
Jno. G. Hinkel Jr.
J. S. Barker.
Inventor:
Frank M. Sparrow
by Foster & Freeman
Attys
N. PETERS, Photo-Lithographer, Washington, D. C.

(No Model.) 2 Sheets—Sheet 2.
F. M. SPARROW.
ELECTRIC VALVE OPERATING DEVICE.
No. 394,220. Patented Dec. 11, 1888.
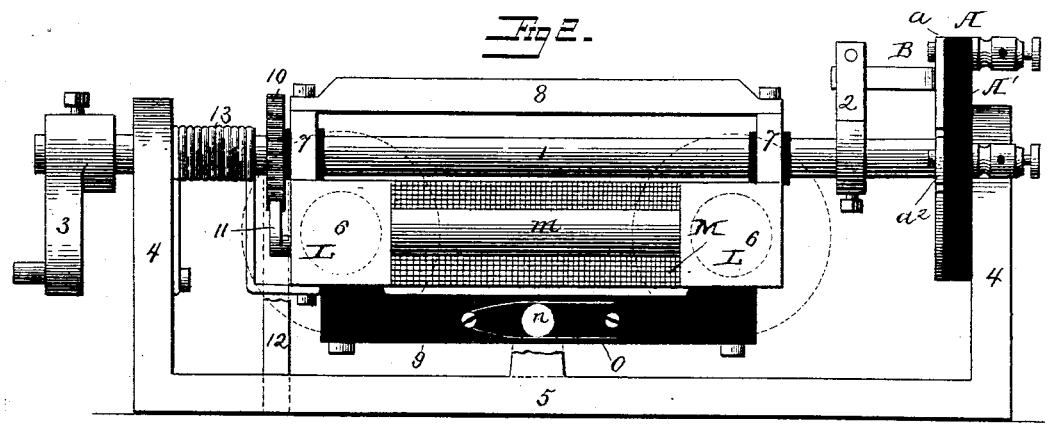
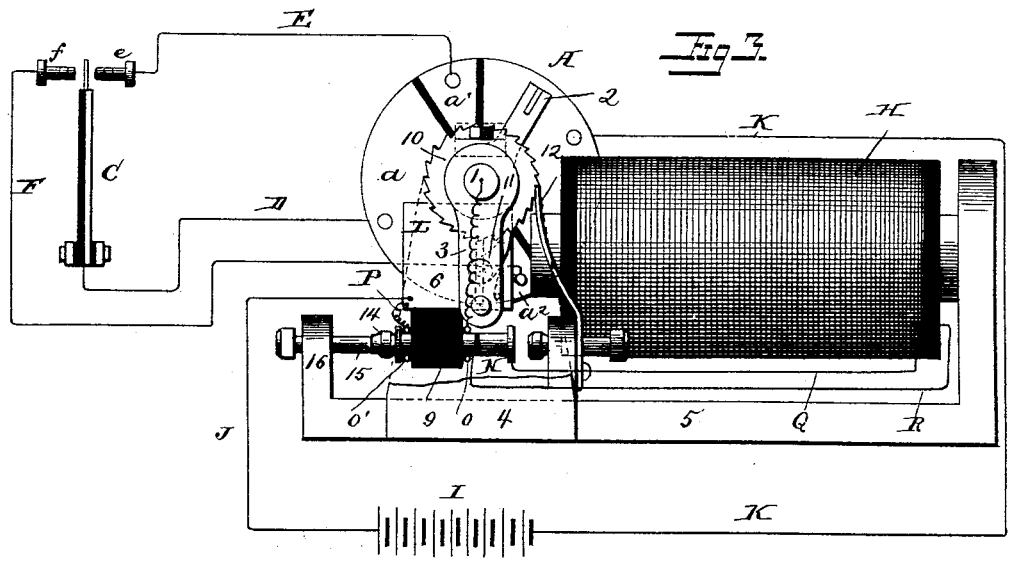
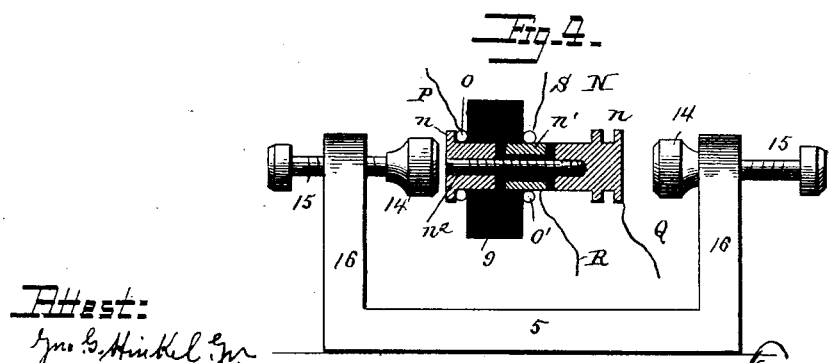
Attest:
Jno. G. Hinkel Jr.
J. S. Barker
Inventor:
Frank M. Sparrow,
by Foster & Freeman
Attys

UNITED STATES PATENT OFFICE.

FRANK MILLER SPARROW, OF MATTAPOISETT, MASSACHUSETTS.

ELECTRIC VALVE-OPERATING DEVICE.

SPECIFICATION forming part of Letters Patent No. 394,220, dated December 11, 1888.

Application filed September 3, 1887. Serial No. 248,734. (No model.)

*To all whom it may concern:*

Be it known that I, FRANK MILLER SPARROW, a citizen of the United States, and a resident of Mattapoisett, Plymouth county, Massachusetts, have invented certain new and useful Improvements in Electric Valve-Operating Devices, of which the following is a specification.

This invention relates to devices operated by electricity and intended to regulate dampers or valves, or perform other more or less analogous operations; and it consists of certain novel arrangements of electric circuits and of devices adapted to render such circuits operative, as will be hereinafter pointed out.

In the drawings, wherein I have illustrated my invention, I have shown it as employed to regulate the temperature of an apartment, with a thermostat to be used in connection therewith; but it will be readily understood that it may as well be employed to regulate the moisture in an apartment, when a hygrometric switch (see Fig. 7) would be substituted for the thermostat; or it might be used for giving time-signals, when a clock mechanism (see Fig. 8) would be substituted for the thermostat. Such modifications and others will readily suggest themselves to those familiar with devices of the nature of my invention, and I therefore do not wish to be limited to all the details shown.

Figure 1 is a perspective view illustrating the circuits in a device driven by an electric motor. Fig. 2 is a side view of a different and preferred form of my invention, parts being omitted for the sake of greater clearness. Fig. 3 is an end view of the device shown in Fig. 2. Fig. 4 is a transverse sectional view, enlarged, of the circuit-changing switch and the parts adjacent thereto. Fig. 5 is a face view of the circuit-breaking wheel or disk detached. Fig. 6 is a diagrammatic view showing the circuits of the apparatus illustrated in Fig. 2. Figs. 7 and 8 illustrate the electric connections with a hygrometric switch and a clock, respectively.

In the drawings, A represents generally a circuit breaking and changing wheel or disk having a main conducting-plate, $a$, and smaller conducting-plates, $a'$ $a^2$, these being insulated from each other, preferably, by being supported upon an insulating-back, A'. Over the plates of this disk travels a brush, B, in this instance shown as carried by an arm, 2, secured to a shaft, 1, driven by an electric motor, and connected through crank 3 with the valves or dampers to be regulated, so as to operate them by its revolution.

C indicates a thermostat, connected by conductor D with plate $a$ of disk A, and having its free end adapted to lie between and make contact with screws $e\,f$, which are united by conductors E F with plates $a'$ $a^2$, respectively. The brush B is connected by conductor G, which has electric connection therewith through shaft 1 and its supporting-frame, or in other convenient manner, with one of the commutator-brushes of an electric motor, H, the other brush of which is connected with the battery I by conductor J. The circuit is completed through conductor K, uniting the battery and plate $a$ of the circuit-breaking disk.

The commutator-shaft of the motor H carries a pinion which drives through suitable gearing, 17, the shaft 1, and through it operates the valves or performs other mechanical operations. It will now be seen that whatever be the position of the thermostat, so long as the brush B is in contact with plate $a$, a circuit, which I term the "main" circuit, will be complete from battery, through conductor J, motor H, conductor G, brush B, plate $a$, and conductor K, back to battery. The current over such circuit keeps the motor in operation, and through it turns shaft 1, thus changing the position of the valves or other devices operated thereby until the brush passes from plate $a$ to one or the other of the smaller insulated plates, when, the thermostat being in the position shown in the drawings, the circuit will be broken and all motion will cease.

The brush will normally rest upon one of the insulated plates $a'$ $a^2$, which are so related relatively to shaft 1 that when the brush rests thereon the valves or dampers are in position either to cut off or to turn on the heat as the brush rests on one or the other of the plates. Assuming the brush to be resting upon plate $a'$, the heat to be turned on, and the temperature of the apartment to have so far risen as to bring the thermostat into contact with screw $e$, a circuit will then be established over both the main circuit and the partial circuit containing the thermostat, which is then cut into the main circuit and may be traced through battery, conductor J, motor H, conductor G, brush B, plate $a'$, conductor E, contact $e$, thermostat, conductor D, plate $a$, and conductor K to battery. This will start the motor, which will continue in motion until the brush passes from plate $a'$ onto plate $a$, when the current will continue uninterrupted, but will pass over the main circuit only, and will so continue until the brush passes onto plate $a^2$, when, the apparatus having moved so far as to change the position of the valve or damper, the circuit will be broken and motion will cease. The parts will in this position remain at rest until, the temperature falling below the predetermined limit, contact is made between C and $f$, when, a circuit being closed through the motor, the apparatus will continue in motion until the desired change in the position of the valves is made, as will be understood without further description.

The contact between the thermostat and screws $e$ or $f$ need only be sufficiently long to allow the motor to carry the brush past the insulated plate, for after it has once come into contact with plate $a$ the current will be maintained irrespective of the position of the thermostat, the partial circuit in which the latter is situated having been cut out of the main circuit when the brush has left the insulated plate, as has been explained.

The above-described apparatus shown in Fig. 1 is a simple embodiment of part of my invention; but that which I now prefer to employ is shown in Figs. 2, 3, and 4, and the currents thereof illustrated diagrammatically in Fig. 6. Referring to said figures, it will be seen that the circuit-breaking wheel or disk A, its electric connections with the thermostat, the shaft 1, and the brush-switch B are similar to the same parts in the Fig. 1 construction; but in place of the motor there shown I have shown another, which I prefer, to rotate shaft 1. This shaft-rotating device may be said, in general terms, to consist of a swinging armature which by its vibrations imparts motion to the shaft, a magnet controlling movements of said armature, and a circuit-changing switch adapted to reverse the direction of current in the magnet, whereby it alternately attracts and repels the armature, and thus vibrating it gives motion to the shaft.

I will now describe in detail the apparatus in which I have embodied these general features.

The shaft 1 is mounted in bearings 4 of a frame, 5, preferably of metal, which also supports the other parts of the apparatus. Hung upon this shaft so as to have a free vibratory or swinging movement thereon is an armature, L, moving in the magnetic field of an electro-magnet, H. This armature is of peculiar construction, consisting of blocks 6, having bearings 7, encircling the shaft and connected below the shaft by the core $m$ of an electro-magnet, M.

8 is a non-magnetic bar connecting the upper ends of the bearings 7 of blocks 6 and forming a counterpoise for the swinging armature-frame, and 9 is another bar of insulating material supported by blocks 6 below magnet M, for a purpose to be described.

It will be seen from the above description and an examination of the drawings that the blocks or bearing-pieces 6 form the opposite poles of the magnet M, the bearings 7 being insulated from shaft 1. The shaft may be connected with the swinging armature-frame in any desired manner, as by a ratchet-wheel, 10, secured to shaft 1 to one side of the swinging armature-frame, and a spring-pawl, 11, carried by said frame and operating to advance wheel 10, and through it the shaft, with a step-by-step motion as the frame vibrates, backward movement of the wheel and shaft being prevented by the detent or spring-dog 12, carried by some stationary portion of the device and bearing against the teeth of said wheel.

The direction of the current through magnet M is uniform, and its polarity therefore remains unchanged, while that through magnet H is reversed at each movement of the armature L, thus causing its polarity to be changed at each reversal of the current and alternately presenting opposite poles and like poles to the poles of armature-magnet M. This results in alternately attracting and repelling the armature L and its frame, thus giving thereto a swinging motion and so rotating the shaft.

13 is a spring connected at one end to the swinging armature-frame and at the other to some stationary part of the device, and operating to assist in withdrawing the frame from magnet H when the latter repels the armature, this spring, if found desirable, being insulated from the shaft 1.

For reversing the current in magnet H, I may employ any style of circuit changing or reversing switch adapted to accomplish such result; but in an apparatus of the style I am now describing I prefer to employ what I term a "plug-switch" or "circuit-changer" carried by the swinging armature-frame and shifted at each vibration thereof. It is indicated, generally, by reference-letter N, and is shown in detail, enlarged, in Fig. 4. It consists of a cylindrical plug or bar mounted loosely in the insulating-bar 9, and having enlarged disk-shaped heads adapted to bear against the insulated ends 14 of screws 15, which are adjustable in uprights 16 of the frame 5. This switch-bar is of a length considerably greater than the thickness of bar 9, and is so arranged that as the magnet-carrying frame swings it is slid therein, as its opposite ends alternately come in contact with the opposite screws, 14. It consists of three metallic parts, n n' n, the two outer, n n, of which are in electric connection by any suitable means, as the screw $n^2$, while the middle part, n', is insulated therefrom.

O O' are two wires or other electric conductors, preferably of V shape, mounted on opposite sides of bar 9 and embracing sliding plug or bar N. The length of switch-bar and the relations of its parts to each other are such that one of the conductors O O' will always bear upon one of the end parts, n, of the switch, while the other will bear upon the central portion, n', thereof, as the switch-bar is slid in its support by vibration of the armature, the middle part, n', being alternately in engagement with conductors O and O'.

Having thus described the construction of parts peculiar to the apparatus shown in Figs. 2, 3, and 4, I may now describe the electrical connections whereby these parts are rendered operative.

It will be necessary to trace the connections only to the switch-brush B and the plate a, beyond which they are identical with those shown in Fig. 1, as has been set forth.

The conductor J from the battery unites with one of the terminal wires of magnet M, Fig. 6, the other terminal wire of the magnet M being connected by conductor P with V-shaped conductor O, which, when the parts are in the position indicated in Figs. 3 and 4, is in contact with one of the end pieces of the plug or bar switch N. These said pieces (the two being in electric connection) are united by conductor Q with one of the terminal wires of the working-magnet H. The other terminal wire of the magnet H is connected by conductor R with the central insulated section, n', of switch N, from which the circuit continues through conductors O' and S to the brush, the connection between conductor S and the brush being through the shaft 1 or other suitable part of the frame, or in any other convenient manner.

So long as brush B is in contact with plate a the current will be maintained, though intermittently, by reason of the circuit-changing switch N, through the main circuit; but as soon as it passes onto either one of the insulated plates, a or a', there is a break in the main circuit, which can be made complete only through the partial circuit, including the thermostat, by the contact of the latter with one of the contact screws or plates. The magnet N being situated between the battery and the circuit changing or reversing switch N, it follows that the direction of the current through it is uniform and its polarity therefore unchanged, while on the other hand the said switch, being situated between the battery and magnet H, reverses the direction of the current through the working-magnet at each movement of its armature, and thereby changing its polarity causes alternate attraction and repulsion of its armature and thereby its movement.

I have observed that the attractive force between an electro-magnet and an armature which has not been previously employed is for a given current much greater than that between the same magnet and armature after they have been once brought into contact. In order, however, to obtain an attractive force nearly equal to that thus primarily produced, it is necessary to reverse the current between each contact, and the attraction weakens unless the closing of the circuit is followed by complete attraction of the armature. The apparatus last described secures this relatively great attractive force between the magnet and its armature, the constant polarity of the swinging armature-magnet M acting conjointly with the changing polarity of the motor-magnet H to cause ready and strong attraction and repulsion, even though the current employed be weak.

Many changes will readily suggest themselves. For instance, armature L could be supported otherwise than on the shaft which it turns; or, in place of the electro-magnet armature L described, one consisting of a non-magnetized bar of iron or of an ordinary bar-magnet might be employed.

Brush B might be stationary and the disk A made to travel past it; or a different switch from the brush B might be employed to cut the partial circuit containing the thermostat out and into the main circuit.

I do not in this application claim any features made the subject-matter of claims in another application of mine, Serial No. 224,163, filed January 12, 1887, particularly to the circuit-changer A, broadly considered. All such changes which do not depart from the spirit of my invention I do not consider material.

Without limiting myself to the exact construction of parts shown and described, I claim—

1. The combination, with a valve-operating mechanism, of an electric motor which moves said mechanism, a main circuit in which is situated said motor, a partial circuit containing a thermostat or its equivalent, and a switch between said circuits operated by the motor when the thermostat makes contact to cut out the partial circuit containing the thermostat and to close the main circuit direct, substantially as set forth.

2. The combination, with a valve-operating mechanism, of an electric motor actuating the same, a thermostat, a circuit-breaking disk or wheel, a main circuit in which is the motor and including a conducting-plate of the circuit-breaking disk, a partial circuit in which is situated the thermostat, including insulated plates of said disk, and a brush-switch moved by the electric motor normally resting on one of said insulated plates, and arranged, when circuit is closed through the partial circuit by the thermostat, to move onto the main conducting-plate and cut out the thermostat, substantially as set forth.

3. The combination, with a valve-controlling mechanism, of an electric motor arranged to operate said mechanism, a thermostat or its equivalent, a circuit-breaking disk having a main metallic portion, $a$, in connection with the battery and also with the thermostat, and having also insulated portions in connection with the opposite contacts of the thermostat, and a brush in connection with the motor and adapted to bear on said circuit-breaking disk, substantially as described.

4. The combination, with a valve-operating mechanism and a thermostat controlling the movements of the valve-operating mechanism, of a swinging armature, operative connections between said armature and valve-operating mechanism, an electro-magnet opposite the armature, a circuit in which is said magnet, and an automatic switch which reverses the current in the magnet, whereby the armature is alternately attracted and repelled, substantially as set forth.

5. The combination, with a shaft adapted to operate a damper or valve and a thermostat controlling the movements of the shaft, of a swinging armature loosely hung upon the shaft, connections between the shaft and armature whereby the latter is turned with a step-by-step motion as the armature vibrates, an electro-magnet mounted opposite said armature, a circuit in which is said magnet, and a switch which alternately reverses the current in the magnet as the armature vibrates, substantially as set forth.

6. The combination, with a valve-operating mechanism and a thermostat controlling the movements of the valve-operating mechanism, of a swinging armature, operative connections between said armature and valve-operating mechanism, an electro-magnet opposite the armature, a circuit in which is situated said magnet, a switch carried by said armature, and stops which change its position as the armature swings, whereby the current in the magnet is reversed, substantially as described.

7. The combination, with a valve-operating mechanism and a thermostat controlling the movements of the valve-operating mechanism, of a swinging armature, operative connections between said armature and valve-operating mechanism, an electro-magnet opposite the armature, a circuit in which is situated said magnet, a switch consisting of a bar having a central insulated metallic portion and two end metallic portions in electric connection with each other, the terminal wires of the magnet being connected, respectively, with the central and end parts of said switch, and means for moving said switch past conductors bearing, respectively, alternately on the central and end parts thereof as it is moved, substantially as described.

8. The combination, with a shaft adapted to operate a damper and a thermostat controlling the movements of the shaft, of a swinging armature loosely hung upon the shaft, connections between the shaft and armature whereby the latter is turned with a step-by-step motion as the armature vibrates, a magnet opposite said armature, a circuit in which said magnet is situated, and a circuit-changer consisting of a sliding bar or plug having a central insulated portion and two end portions having metallic connection, the opposite ends of the wire from the magnet being connected, respectively, with the insulated portion and one of the end parts of the said bar or plug, electric conductors in said circuit on opposite sides of the magnet engaging with said circuit-changer—one with one end piece and one with the insulated portion — and means for sliding the circuit-changer as the armature is moved to bring the insulated portion thereof in contact alternately with said electric conductors to reverse the current in the magnet, substantially as set forth.

9. The combination, with a vibrating armature, its magnet, mechanism adapted to be moved by the vibration of the armature, and a thermostat controlling the starting of said mechanism, of an insulating-support carried by the armature, a sliding circuit-changing bar or plug mounted loosely in said support and consisting of two metallic end pieces electrically connected, and a central portion insulated from the end pieces, conductors in circuit with the magnet mounted on opposite sides of the insulating-support and bearing on the sliding bar or plug, the wire forming the spool or spools of the magnet having its opposite ends connected one with the central insulated part of the sliding bar or plug and the other with one of the end pieces thereof, and stops to limit the movement of the sliding switch to cause it to slide in its support in order to reverse the current through the magnet, substantially as described.

10. The combination, with a valve-operating mechanism and a thermostat controlling the starting of the said mechanism, of a swinging armature which moves said mechanism, carrying a magnet having its poles mounted opposite the poles of the armature-magnet, a circuit in which is placed said electro-magnet, and a switch in said circuit which reverses the current in said electro-magnet as the armature is vibrated, substantially as set forth.

11. The combination, with a valve-operating mechanism and a thermostat controlling the starting of said mechanism, of a swinging armature carrying an electro-magnet, operative connections between the armature and said valve-operating mechanism whereby vibration of the former moves the latter with a step-by-step motion, a working electro-magnet having its poles opposite the poles of the armature-magnet, a circuit in which are placed both said magnets, and a circuit-changer situated between the two magnets, whereby the current is reversed in the working-magnet as the armature vibrates, substantially as set forth.

In testimony whereof I have signed my name to this specification in the presence of two subscribing witnesses.

FRANK MILLER SPARROW.

Witnesses:
ELLIS MENDELL,
CHARLES F. AMES.